(12) United States Patent
Macbeth

(10) Patent No.: US 6,229,679 B1
(45) Date of Patent: May 8, 2001

(54) ARC FAULT CIRCUIT INTERRUPTER WITHOUT DC SUPPLY

(76) Inventor: Bruce F. Macbeth, 569 Cumberland Ave., Syracuse, NY (US) 13210

( * ) Notice: Subject to any disclaimer, the term of this patent is extended or adjusted under 35 U.S.C. 154(b) by 0 days.

(21) Appl. No.: 09/211,747

(22) Filed: Dec. 15, 1998

(51) Int. Cl.$^7$ .................................................. H02H 3/00
(52) U.S. Cl. ............................................................ 361/42
(58) Field of Search ................................. 361/42–50, 78, 361/79, 88, 93.1, 93.2, 93.6, 99, 100, 101, 102; 324/76.42, 76.44, 76.45, 520–522; 702/FOR 103–FOR 107

(56) References Cited

U.S. PATENT DOCUMENTS

| | | | |
|---|---|---|---|
| 4,639,817 | * 1/1987 | Cooper et al. | 361/62 |
| 5,121,282 | 6/1992 | White | 361/42 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 361/113 |
| 5,224,006 | 6/1993 | MacKenzie et al. | 361/45 |
| 5,307,230 | 4/1994 | MacKenzie | 361/96 |
| 5,432,455 | 7/1995 | Blades | 361/113 |
| 5,434,509 | 7/1995 | Blades | 361/113 |
| 5,452,223 | 9/1995 | Zuercher et al. | 361/79 |
| 5,453,723 | 9/1995 | Fello et al. | 335/18 |
| 5,459,630 | 10/1995 | MacKenzie et al. | 361/45 |
| 5,519,561 | 5/1996 | Mrenna et al. | 361/105 |
| 5,590,012 | 12/1996 | Dollar, II | 36/42 |
| 5,682,101 | 10/1997 | Brooks et al. | 324/536 |
| 5,691,869 | 11/1997 | Engel et al. | 361/42 |
| 5,706,154 | 1/1998 | Seymour | 361/42 |
| 5,706,159 | 1/1998 | Dollar, II et al. | 361/113 |
| 5,726,577 | 3/1998 | Engel et al. | 324/536 |
| 5,729,145 | 3/1998 | Blades et al. | 324/536 |
| 5,805,397 | 9/1998 | MacKenzie | 361/42 |
| 5,805,398 | 9/1998 | Rae | 361/42 |
| 5,815,352 | 9/1998 | MacKenzie | 361/42 |
| 5,818,671 | 10/1998 | Seymour et al. | 361/42 |
| 5,825,598 | 10/1998 | Dickens et al. | 361/42 |
| 5,835,321 | 11/1998 | Elms et al. | 361/45 |
| 5,839,092 | 11/1998 | Erger et al. | 702/58 |

* cited by examiner

Primary Examiner—Ronald W. Leja

(57) ABSTRACT

Arcing faults are detected by sensing a voltage signal proportional to the rate of change, or di/dt, of the line current when the current steps into an arc fault. A current transformer is used to create the di/dt signal. The transformer has a selected core type, number of windings, and size which saturates at a pre determined level of primary current. The saturation acts to clamp the maximum di/dt voltage signal at the transformer output, and produce a constant output voltage. The constant output voltage eliminates a signal with a high di/dt, which may occur during a lamp burnout, from producing a much larger di/dt signal than that caused by an arc fault at a lower level of step current. The di/dt signal is passed through a high pass filter, which attenuates 60 hz sinusoidal signals, after which the signal is integrated. The integrator acts to delay circuit interruption means until a predetermined number of arcs has occurred. When the integrator voltage reaches a predetermined voltage level, a trigger device activates an electronic switch, which in turn activates circuit interrupting means. One of the novel aspects of this invention is the elimination of the need for a DC power supply.

19 Claims, 4 Drawing Sheets

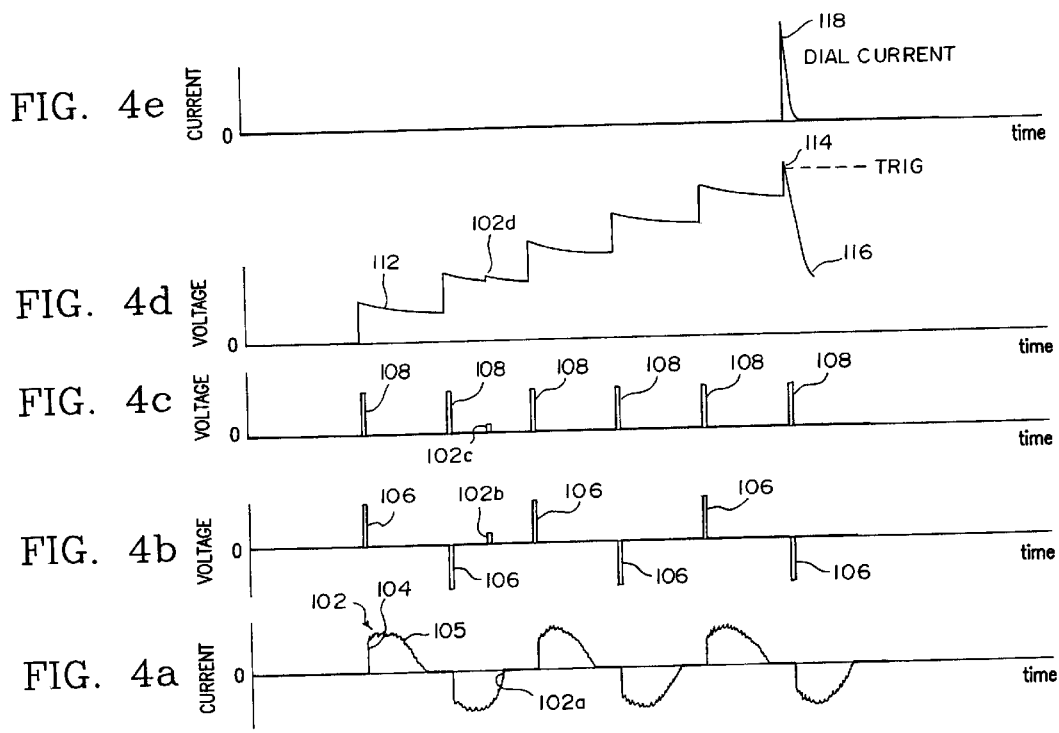

ARC FAULT CIRCUIT INTERRUPTER WITHOUT DC SUPPLY

BACKGROUND OF THE INVENTION

1. Field of the Invention

This invention relates to an apparatus for detecting arc faults in electrical power lines, and more particularly to apparatus that does not include a DC power supply.

2. Description of the Prior Art

A number of devices and methods have been used in the past to detect arc faults. Some of the prior art devices and techniques have involved the use of E and B field arc sensors, the detection of the amplitude of arc fault rate of change of current signals, the use of nonoverlapping bandpass filters to detect white noise of arcs, and devices which detect the disappearance of arcs faults near current zero crosses. Most of the prior art of arc detection occurs in circuit breakers where it acts as an enhancement to thermal-magnetic detection elements, which alone may fail to detect arc faults.

There is a need for an economical arc fault detector which may be mounted into a wiring device which offers the same down stream protection as an arc fault detecting circuit breaker but at the similar cost advantage that currently exist between ground fault interrupting receptacles and ground fault interrupting circuit breakers. This invention provides that cost advantage.

SUMMARY OF THE INVENTION

It is an object of this invention to provide an arc fault circuit interrupter that is simpler and less expensive to manufacture than those previoulsy known. Briefly stated, and in accordance with a presently preferred embodiment of the invention, an arc fault detecting circuit includes a saturating current transformer coupled to the electric power circuit to be protected that senses arc fault steps in current. A rectifier is preferably connected to the sensor, and an integrator is connected to the rectifier. The integrator voltage is used to activate a trigger device. The trigger device activates circuit interrupting means. The device does not require a DC power supply as found in the prior art .

The saturating current transformer produces a constant output voltage at a pre determined level of arc fault current which eliminates an instant integrator charge on a large pulse of current such as occurs during lamp filament burn-out.

In accordance with a further embodiment of the invention, a second integrator and trigger device is used to mitigate the effect of nomal switching arcs and also the brief high current arc pulses that may occur such as those produced by a lamp filament burnout.

BRIEF DESCRIPTION OF THE DRAWINGS

FIGS. 4(a–e) illustrates waveforms in the circuit of FIG. I

DESCRIPTION OF THE PREFERRED EMBODIMENT

Figure 1:
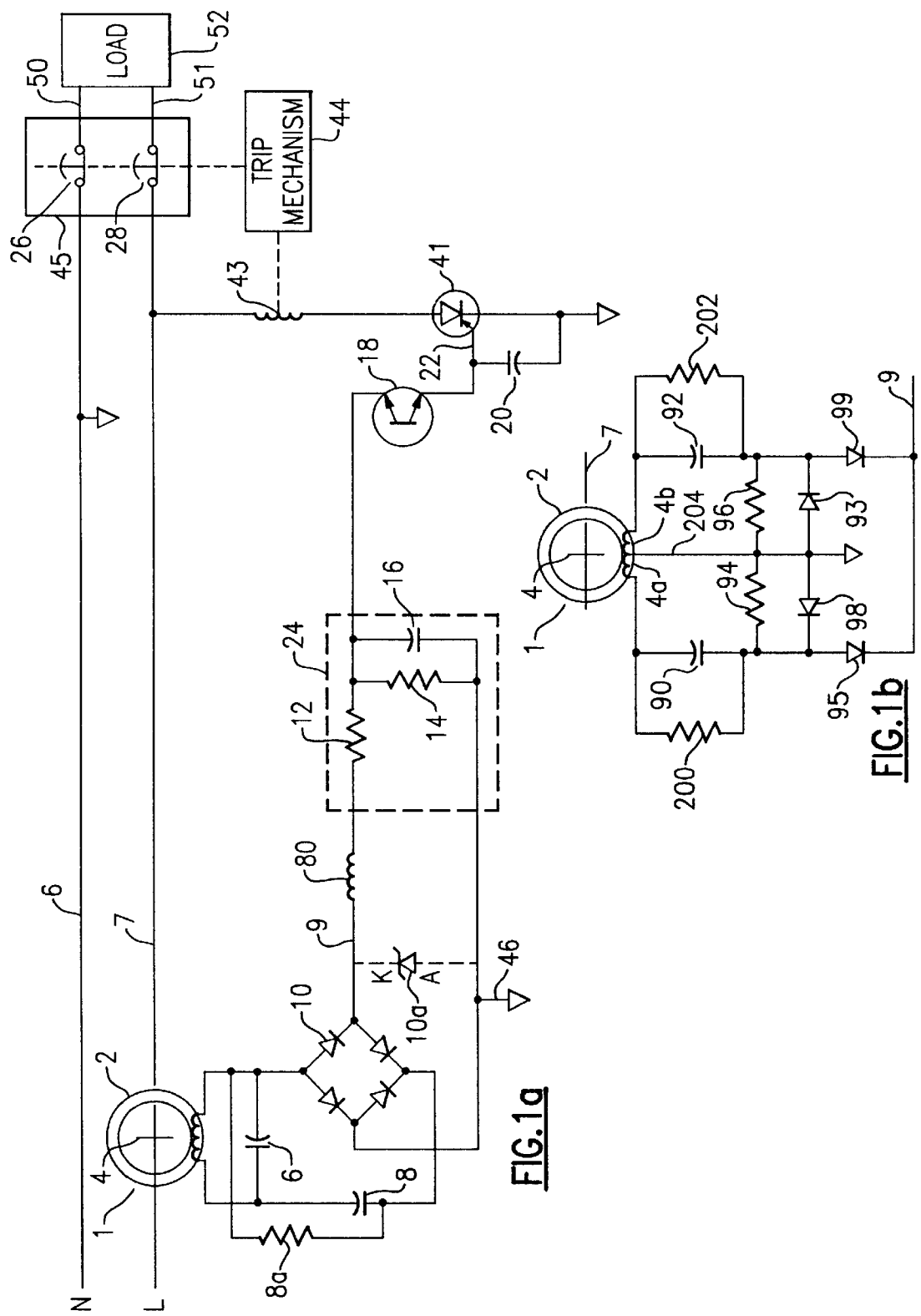
FIGS. 1(a–b) illustrate the circuit in which arc fault detection is performed.

An arc fault detector in accordance with this invention is intended for incorporation into a receptacle, plug, or cord type device which is and in mechanically similar to ground fault interrupter devices such as those shown in U.S. Pat. No. 5,594,358, and 5,510,760.

Referring now to FIG. 1a, one embodiment of the invention is shown in schematic diagram form, showing an electrical power line, comprising neutral conductor 50 and a line conductor 51, and a load 52. The neutral and line conductors are both protected by contactor mechanism 45. Contactor mechanism 45 is a spring loaded mouse trap type device, which is controlled by trip mechanism 44. Conduction of SCR 41 activates solenoid 43 which activates trip mechanism 44. When the trip mechanism is activated, the spring loaded contacts 26 and 28 latch open, and stay open until they are manually reset.

An arc fault sensing current transformer 1 is constructed of a high frequency powder metal core 2, wrapped with a secondary winding 4, which surrounds the line conductor 7. The transformer has a core type, number of windings, and size which are selected so that the core saturates at a pre determined level of primary current. The saturation acts to clamp the maximum di/dt voltage signal at the transformer output, and produce a constant output voltage. The constant output voltage eliminates an arc fault mimiking signal, such as occurs during a lamp burnout. During lamp burnout a few brief pulses of high di/dt current may occurs causing more of an arc sensed effect on the detector than that of sustained lower di/dt levels of actual arc fault current. Preferably, an inductor 80 is provided, which is not required when using the saturating transformer, and which can be replaced by a short, as another method of limiting the effect of lamp burnout type pulses on the detector. The inductor 80 places a higher impedance in the signal path for large di/dt signals and is another method of limiting the effect of brief high di/dt signals on the detector.

The line conductor 7 is used as the arc fault sensed conductor as any current arcing to neutral or ground will be supplied from this wire. The current transformer I is connected to bridge rectifier 10 by way of series capacitor 8. Capacitor 8, in conjunction with resistor 8a, acts as a high pass filter for rejecting 60 hz sinusoidal signals.

When an arc fault occurs, step changes in current produce rectified pulses at the output of bridge rectifier 10. The rectified pulses are integrated by an integrator 24, after passing through the optional choke 80, for a predetermined time interval. The repeated charge pulses, act to charge capacitor 16, and raise the voltage across capacitor 16 to the trigger threshold of diac 18. Diac 18 is a trigger device which triggers into conduction at one voltage, and which then shuts off at a lower voltage. The diac conduction discharges a portion of the charged stored in capacitor 16 into the gate 22 of SCR 41 triggering the SCR into conduction. The diac avoids the situation which may occur when the diac is replaced by a zener diode. With a zener diode used in place of the diac, after capacitor 16 has charged to the voltage level which causes the zener to conduct, the amount of current delivered by the next following signal pulses may be too small to latch SCR 41 into conduction. The low current case is avoided with a diac. Circuit parameters-such as the SCR required gate current, may need to be adjusted to cause a zener diode to act as a trigger. SCR 41 conduction energizes solenoid 43 which activates trip mechanism 44 opening contacts 45.

Capacitor 6 is used for transient suppression of noise at frequencies above that required for arc detection. Capacitor 20 acts to suppress noise voltage that may cause false triggering of SCR 41. Zener diode 10a is an optional voltage clamp, or limiter connected between line 9 and circuit common 46, and performs the same function as the saturating current transformer in limiting the di/dt voltage pulses to a constant level. Resistor 14 discharges the integrator capacitor 16 after a pulse charging sequence has terminated. Resistor 8a is a bleeder resistor for capacitor 8 and performs the same function as resistor 14. Resistor 8a, zener 10a, capacitors 6,8, and 20, may be eliminated without the loss of arc detection.

Capacitor 6 is an EFT suppression capacitor. Unlike most or all of the prior art, this design is very simple, and has the advantage of not requiring a DC power supply.

FIG. 1b shows another embodiment of the sensor transformer, high pass filter, and rectifier. This circuit acts as a high pass filter, rectifier and voltage doubler. Capacitors 90 and 92 form a high pass filter with resistors 94 and 96. An arc step in one direction causes a positive voltage at 91 with respect to the transformer center tap 204, which is also connected as circuit common. At the same time the arc step produces a negative voltage at line 97 with respect to the center tap 204. The positive voltage drives a current through high pass capacitor 92, and is rectified by diode 99, where the current then passes out to the sensor pulse line 9. At the same time, a current passes from the center tap 204 through diode 98 and capacitor 90 and back to the transformer secondary at 97. This current charges capacitor 94 and causes the capacitor to store charge. When an arc step in the other direction occurs, line 97 of secondary 4a becomes positive with respect to the center tap. This voltage drives a current through capacitor 90, into diode 95, and then out to signal line 9. The current moves the stored charge in capacitor 90 plus the new charge arriving with the current from the transformer into the integrator capacitor 16, where it acts to pump the voltage above the level that would have occurred without the stored charge in capacitor 90. The next arc step in of the opposite polatity causes the same charge pump action out of capacitor 92. The capacitors 90 and 92 act as charge pump capacitors. Resistors 200 and 202 are optional bleeder resistors for capacitors 90 and 92. In operation the circuit losses, along with the bleeder resistor discharge action on the capacitors, prevents actual voltage doubling. The voltage doubler action allows a sensor with fewer windings, and lower arc sense pulse amplitudes, to produce the same diac trigger voltage as would occur without the doubler action and with more secondary turns. Those skilled in the art will understand that the components connected across one half of the secondary shown in FIG. 1a could be used with an untapped secondary winding This would produce a voltage doubler circuit that responds only to arc steps in one direction.

Figure 2:
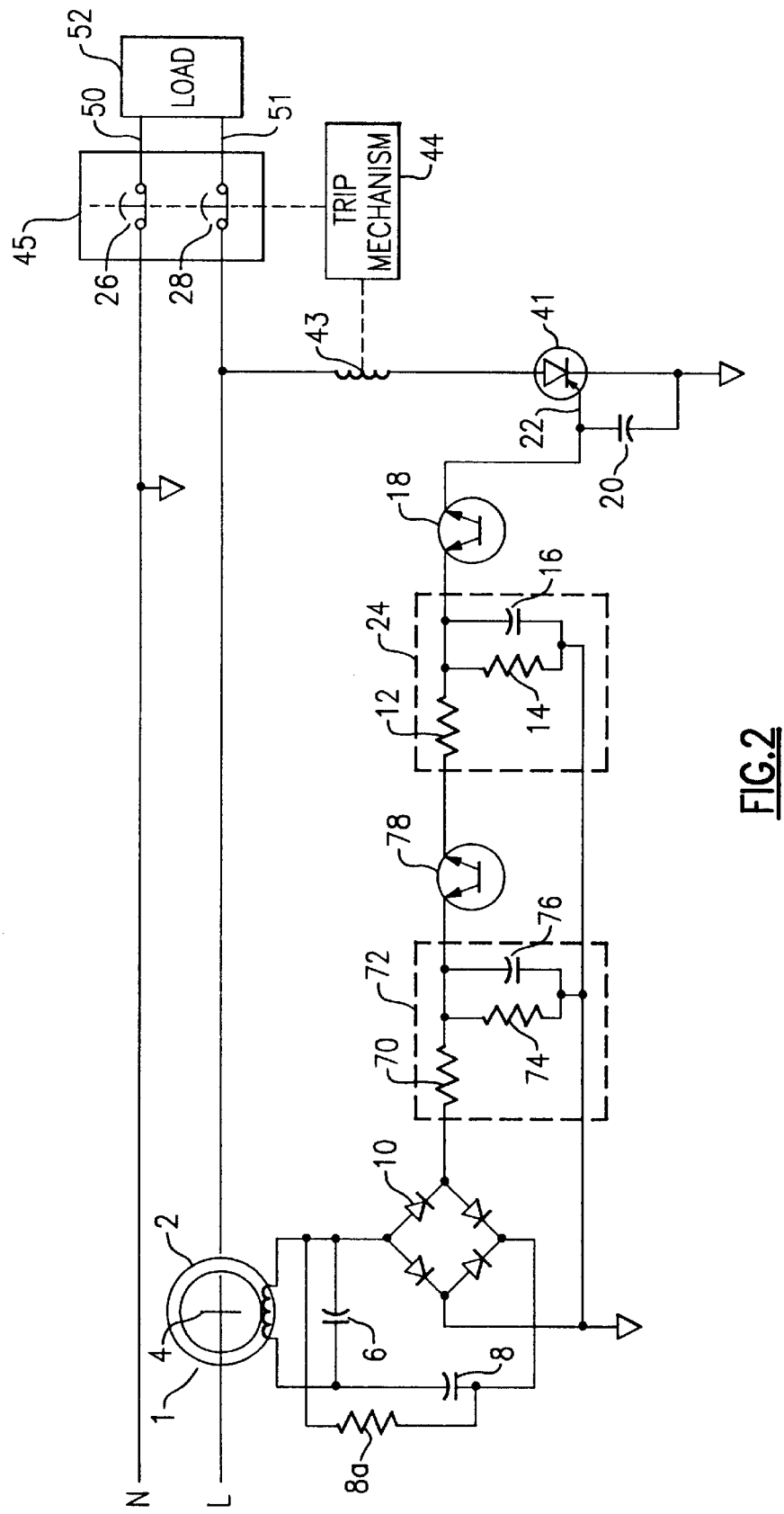
FIG. 2 illustrates an embodiment of the circuit of FIG. 1 showing an additional integrator element.

FIG. 2 shows another embodiment of the circuit of FIG. 1. This circuit has a second integrator block 72 and a second diac 78. All other like parts which are the same as FIG. 1a are like numbered. The integrator time constant of integrator 72 is less than that of integrator 24. Integrator capacitor 76 charges on arc fault signal pulses until the diac trigger voltage is reached. Diac 78 causes substantially constant charge pulses to move into integrator 24. The constant charge pulses eliminate the instant charge that could occur to integrator capacitor 16 during lamp burnout type arc pulses as described above.

Figure 3:
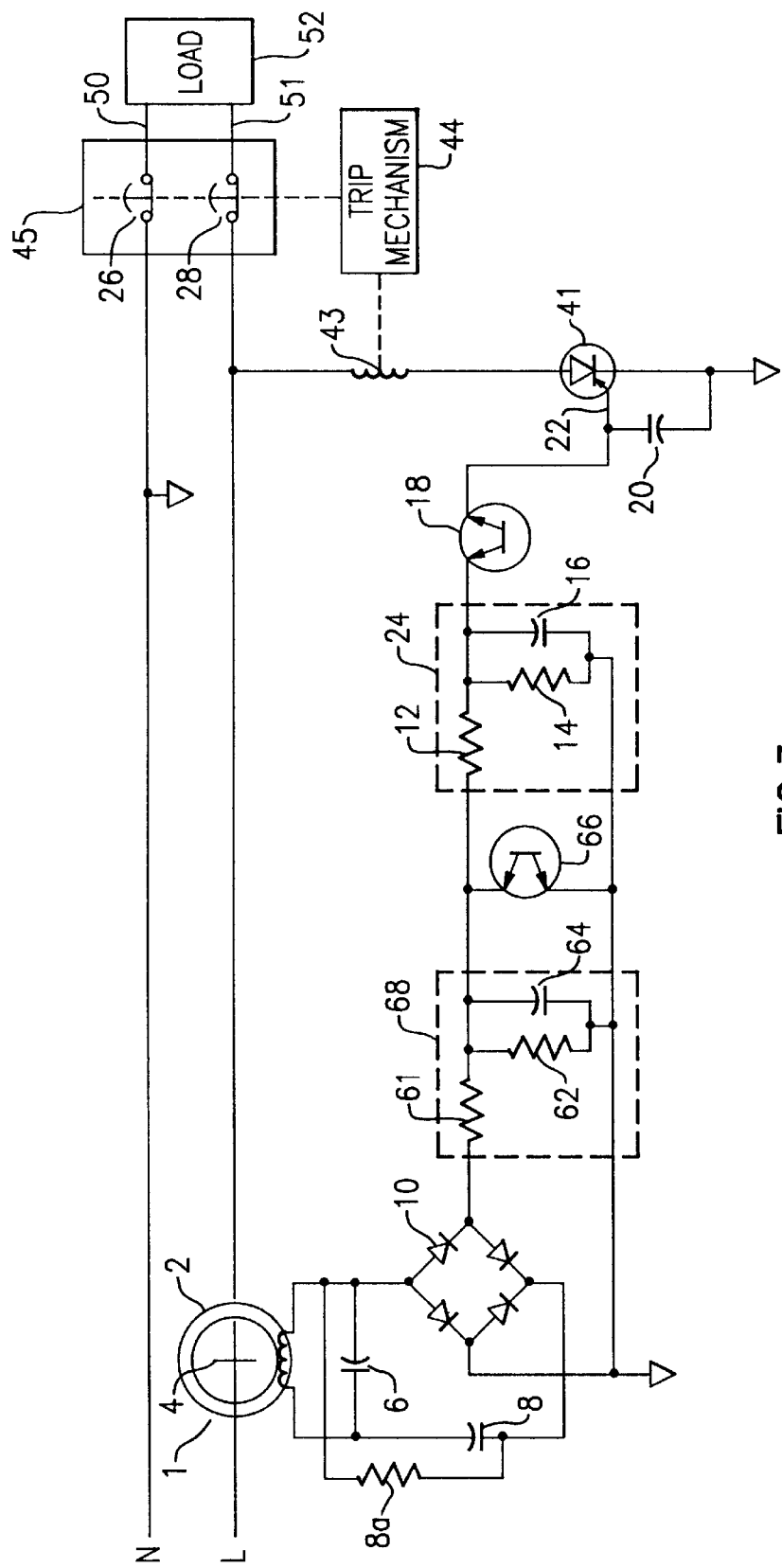
FIG. 3 illustrates another embodiment of the circuit of FIG. 1 showing an additional integrator element with a discharge diac.

FIG. 3 shows a further embodiment to the circuit of FIG. 1. All other like parts are like numbered. In this embodiment integrator 68 is again of a lower timer constant than integrator 24. Diac 66 has a higher trigger voltage than diac 18. When integrator capacitor 64 quick charges on a large arc signal pulse, and which causes the voltage of the capacitor 64 to reach the trigger threshold of diac 66, a pulse of charge is removed from capacitor 64. In this manner large arc signal pulses caused by lamp burn out type events are mitigated by the charge dump action of diac 66. During actual high current arc faults which may trigger the charge dump diac 66, the repetitive signal pulses pass enough charge into integrator 24 before the charge dump diac 66 is triggered. This activates diac 18 and SCR 41.

FIGS. 4(a–e) illustrate waveforms generated in the circuit of FIG. 1. A typical arcing current waveform is shown at 102 in FIG. 4a. Step 104 in FIG. 4a shows one of the step increases in current that generates waveform 106 shown in FIG. 4b at the secondary 4 of transformer 1. The arc current 102 in FIG. 4a will have broadband noise shown at 105. Typically the arc extinguishes at the next current zero cross but in some cases may have a sharp extinguishing edge as shown at 102a in FIG. 4a which may generate a weak pulse shown at 102b, 102c and 102d in FIGS. 4b,4c, and 4d respectively. FIG. 4c pulse 108 shows the bridge rectified pulses. FIG. 4d charge waveform 112 shows the integrator capacitor 16 pulse charging. At 114 in FIG. 4d, the diac triggers into conduction sending a pulse of current 118 into SCR gate 22 causing the SCR to conduct. When the SCR conducts solenoid 43 is energized and activates trip mechanism 44. This opens contact 45 disconnecting the load. Waveform 116 in FIG. 4d shows capacitor 16 discharging to the diac turn off voltage.

While the invention has been described in connection with a number of presently preferred embodiments thereof, those skilled in the art will recognize that many modifications and changes may be made therein without departing from the true spirit and scope of the invention, which accordingly is accordingly is intended to be defined solely by the appended claims.

What is claimed is:

1. A device for detecting arc faults in an electric power circuit, said device comprising:
   a sensor coupled to the electric power circuit which sensor generates a pulse each each time an arc is struck;
   an integrator connected to the sensor for accumulating pulses and generating an output voltage;
   a threshold detector connected to the integrator for generating an arc detecting signal when the voltage reaches a predetermined level;
   in which the integrator and threshold detector are powered solely by the pulses.

2. A device for detecting arc faults in an electric power circuit, said device comprising:
   a sensor coupled to the electric power circuit which sensor generates a pulse each each time an arc is struck;
   a limiter connected to the sensor for limiting amplitude of said pulses to a predetermined limit value;
   an integrator connected to the sensor for accumulating pulses and generating an output voltage;a threshold detector connected to the integrator for generating an arc detecting signal when the voltage reaches a predetermined level;
   in which the limiter, integrator, and threshold detector are powered solely by the pulses.

3. The apparatus of claim 2 in which the limiter comprises a saturating current transformer.

4. The apparatus of claim 1 in which the sensor is a transformer in which the primary winding is a line of the sensed electric power circuit and in which the secondary winding produces pulses proportional to the di/dt of the primary current.

5. The device of claim 1 in which the threshold detector is a diac.

6. The device of claim 1 in which the threshold detector is a zener diode.

7. The device of claim 1 comprising a limiter connected between the sensor and the integrator.

8. The device of claim 7 in which the limiter comprises an inductor.

9. The device of claim 1 comprising a bridge rectifier connected to the sensor.

10. The device of claim 1 in which the sensor is a transformer with a center tapped secondary.

11. The device of claim 1 comprising a high pass filter connected between the sensor and a bridge rectifier.

12. The device of claim 1 comprising;
   a charge pump capacitor connected between the sensor and integrator,
   an integrator capacitor;
   in which the charge pump capacitor acts to increase the voltage level across the integrator capacitor above that level occurring without the charge pump capacitor.

13. A device for detecting arc faults in the electric power circuit comprising:
   a sensor, coupled to the electric power circuit which sensor generates a pulse each time an arc is struck: and
   a detector coupled to the sensor and responsive to the pulses for generating a signal indicating the presence of an arc, the detector being powered solely by the pulses.

14. The device of claim 13 comprising an integrator connected to the sensor for accumulating pulses and generating an output voltage, the integrator being powered solely by the pulses.

15. The apparatus of claim 13 in which the sensor is a transformer in which the primary winding is a line of the sensed electric power circuit and in which the secondary winding produces pulses proportional to the DI/DT of the primary current.

16. The device of claim 14 comprising a limiter connected between between the sensor and the integrator.

17. The device of claim 16 in which the limiter comprises an inductor.

18. The device of claim 13 in which the sensor comprises a transformer with a center tapped secondary.

19. The device of claim 14 comprising a charge pump compacitor connected between the sensor and the integrator.

* * * * *